United States Patent
Booher, Sr. et al.

(10) Patent No.: US 9,951,898 B2
(45) Date of Patent: Apr. 24, 2018

(54) ANTI-TANGLING COUPLING DEVICE

(71) Applicants: Benjamin V Booher, Sr., Scottsdale, AZ (US); Paul J Brown, Paradise Valley, AZ (US)

(72) Inventors: Benjamin V Booher, Sr., Scottsdale, AZ (US); Paul J Brown, Paradise Valley, AZ (US)

( * ) Notice: Subject to any disclaimer, the term of this patent is extended or adjusted under 35 U.S.C. 154(b) by 302 days.

(21) Appl. No.: 14/705,884

(22) Filed: May 6, 2015

(65) Prior Publication Data
US 2015/0323113 A1   Nov. 12, 2015

Related U.S. Application Data

(60) Provisional application No. 61/989,075, filed on May 6, 2014.

(51) Int. Cl.
| | |
|---|---|
| *F16L 21/00* | (2006.01) |
| *F16L 27/08* | (2006.01) |
| *F16C 33/66* | (2006.01) |
| *F16C 19/06* | (2006.01) |

(52) U.S. Cl.
CPC ...... *F16L 27/0828* (2013.01); *F16C 33/6659* (2013.01); *F16C 33/6692* (2013.01); *F16L 21/00* (2013.01); *F16C 19/06* (2013.01); *F16C 2361/00* (2013.01)

(58) Field of Classification Search
CPC .......................... F16L 27/0824; F16L 27/0828
USPC .................................. 285/276, 280, 272, 106
See application file for complete search history.

(56) References Cited

U.S. PATENT DOCUMENTS

| | | | | |
|---|---|---|---|---|
| 2,112,108 | A * | 3/1938 | Mackenzie | F16L 37/252 285/276 |
| 2,412,287 | A * | 12/1946 | Phillips | B65H 75/4478 285/276 |
| 2,421,691 | A * | 6/1947 | Gibson, Jr. | F16L 27/026 285/106 |
| 3,408,095 | A * | 10/1968 | Moore | F16L 27/0828 285/276 |
| 3,479,061 | A * | 11/1969 | Smookler | F16L 27/04 285/106 |

(Continued)

FOREIGN PATENT DOCUMENTS

| | | | | |
|---|---|---|---|---|
| DE | 2947170 A1 * | 6/1981 | ......... | F16L 27/0828 |
| DE | 3324630 A1 * | 1/1985 | ......... | F16L 27/0828 |

*Primary Examiner* — David E Bochna

(57) ABSTRACT

An anti-tangling coupling device has an inner portion which is rotatably engaged with an outer portion. Fluid containment devices such as hoses can be coupled at either end of the device. One hose is secured to the inner portion while a second hose is secured to the outer portion, with the hoses being positioned at opposite ends of each other. Fluid communication is maintained throughout the inner portion and the outer portion, allowing water to flow between hoses coupled with the device. The rotational engagement is achieved by a bearing assembly, the bearing assembly including an inner race, and outer race, and ball bearings secured in cages. The ball bearings are capable of rotational movement (imparted from contact with the first race and second race), but are prevented from translational movement by a cage. As a result the likelihood of tangling between coupled hoses is greatly reduced.

8 Claims, 8 Drawing Sheets

(56) References Cited

U.S. PATENT DOCUMENTS

| | | | | |
|---|---|---|---|---|
| 3,575,060 A * | 4/1971 | Warren | ............... | F16L 27/0828 |
| | | | | 285/276 |
| 3,578,361 A * | 5/1971 | Corrigan | ............. | F16L 27/0828 |
| | | | | 285/276 |
| 3,715,134 A * | 2/1973 | Faccou | ............... | F16L 27/0828 |
| | | | | 285/276 |
| 4,355,827 A * | 10/1982 | Ehret | .................. | F16L 27/0828 |
| | | | | 285/276 |
| 4,561,679 A * | 12/1985 | Choate | ............... | F16L 27/0828 |
| | | | | 285/276 |
| 4,688,830 A * | 8/1987 | Meisinger | ............... | F16L 17/02 |
| | | | | 138/89 |
| 4,752,089 A * | 6/1988 | Carter | ................ | F16L 27/0828 |
| | | | | 285/276 |
| 5,931,507 A * | 8/1999 | Medsker | ............ | F16L 27/0828 |
| | | | | 285/280 |
| 6,086,112 A * | 7/2000 | Schofield | ............ | F16L 27/0828 |
| | | | | 285/276 |
| 6,485,062 B2 * | 11/2002 | Omiya | .................. | F16L 27/087 |
| | | | | 285/106 |
| 6,517,356 B1 * | 2/2003 | Smith | .................. | H01R 39/643 |
| | | | | 285/276 |
| 2012/0139233 A1 * | 6/2012 | Bohner | ............... | F16L 27/0828 |
| | | | | 285/272 |
| 2012/0228870 A1 * | 9/2012 | Ott | ........................ | F16L 27/087 |
| | | | | 285/272 |
| 2014/0138946 A1 * | 5/2014 | Wolff | ................. | F16L 27/0828 |
| | | | | 285/276 |

\* cited by examiner

ANTI-TANGLING COUPLING DEVICE

The current application claims a priority to the U.S. Provisional Patent application Ser. No. 61/989,075 filed on May 6, 2014.

FIELD OF THE INVENTION

The present invention relates to improved apparatuses and methods for preventing 'fouling' of hoses, tubing and other such fluid flow containment means including those subject to certain movement and motions which may cause tangling and twisting of such fluid flow containment means.

BACKGROUND OF THE INVENTION

The present invention, also referred to hereinafter as an "anti-tangling device", is intended to provide improved apparatuses and methods for enhancing the function of swimming pool cleaning and filtration systems, for example and without limitation, such as those comprised of a remote filter and pump, which may be routed through plumbing pipes and fixtures to the pool's wall or other appropriate locations so as to receive a flexible hose, or hose portions extending to a 'vacuum head' or other mechanisms designed to aid the cleaning of the pool's side and bottom surfaces. Various such 'cleaning systems' exist, and as the vacuum head moves along said pool surfaces by one of various drive means, the hose connecting the head to the pool wall becomes tangled and twisted reducing the efficiency and effectiveness of the cleaning system which therefore then requires troublesome manual 'untangling' on a routine basis. The purpose of the anti-tangling device is to prevent the tangling and twisting of the hose by eliminating the torque and other such forces which may accumulate as the head moves in random or any such path(s) during the cleaning cycle/process which ultimately will lead to the hose's tangling and twisting. The functionality of the anti-tangling device may be accommodated by methods and apparatuses as further described and illustrated hereinafter.

DETAIL DESCRIPTIONS OF THE INVENTION

All illustrations of the drawings are for the purpose of describing selected versions of the present invention and are not intended to limit the scope of the present invention.

Figure 1:
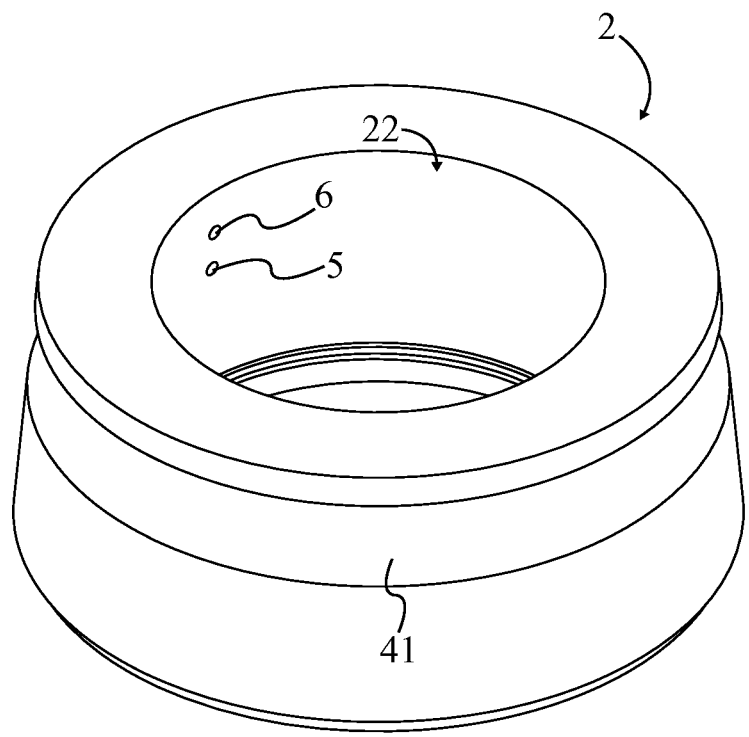
FIG. 1 is a perspective view showing a tube as an inner portion of the present invention.
Figure 2:
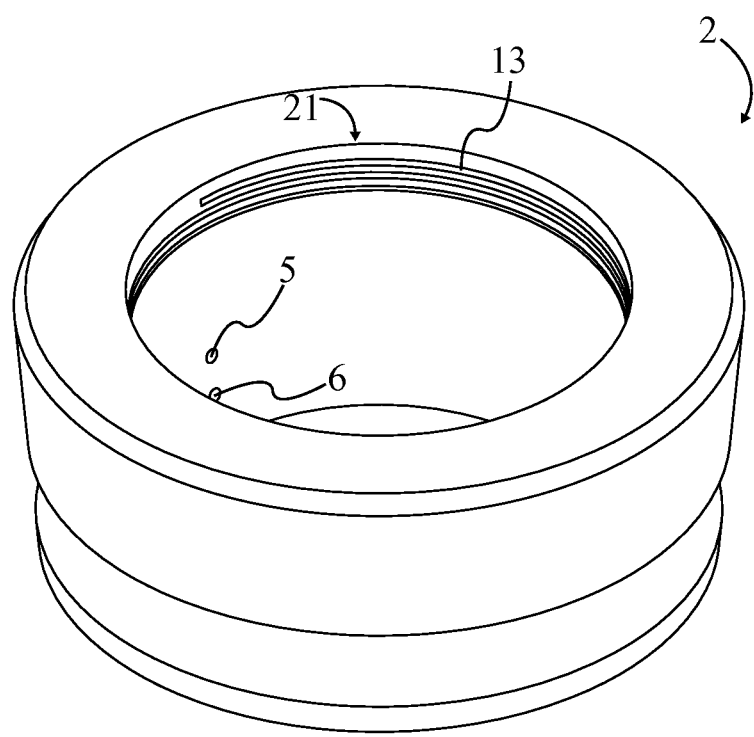
FIG. 2 is a bottom perspective view showing the tube as the inner portion of the present invention.
Figure 3:
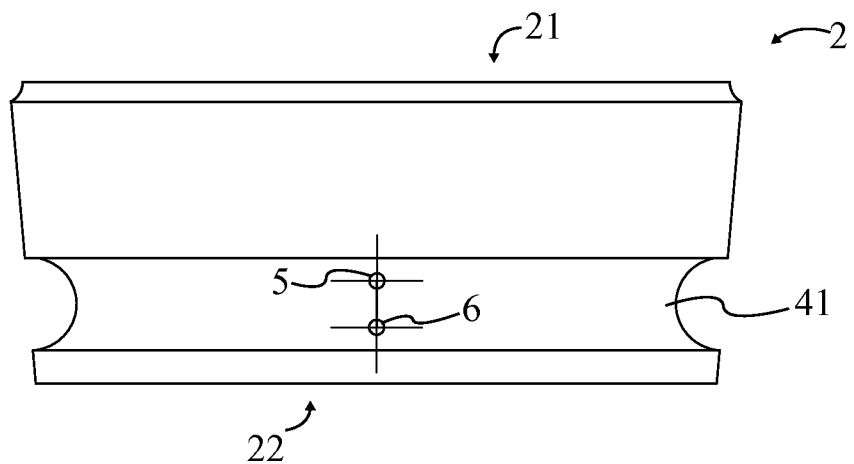
FIG. 3 is a left side elevational view showing the tube as the inner portion of the present invention.
Figure 4:
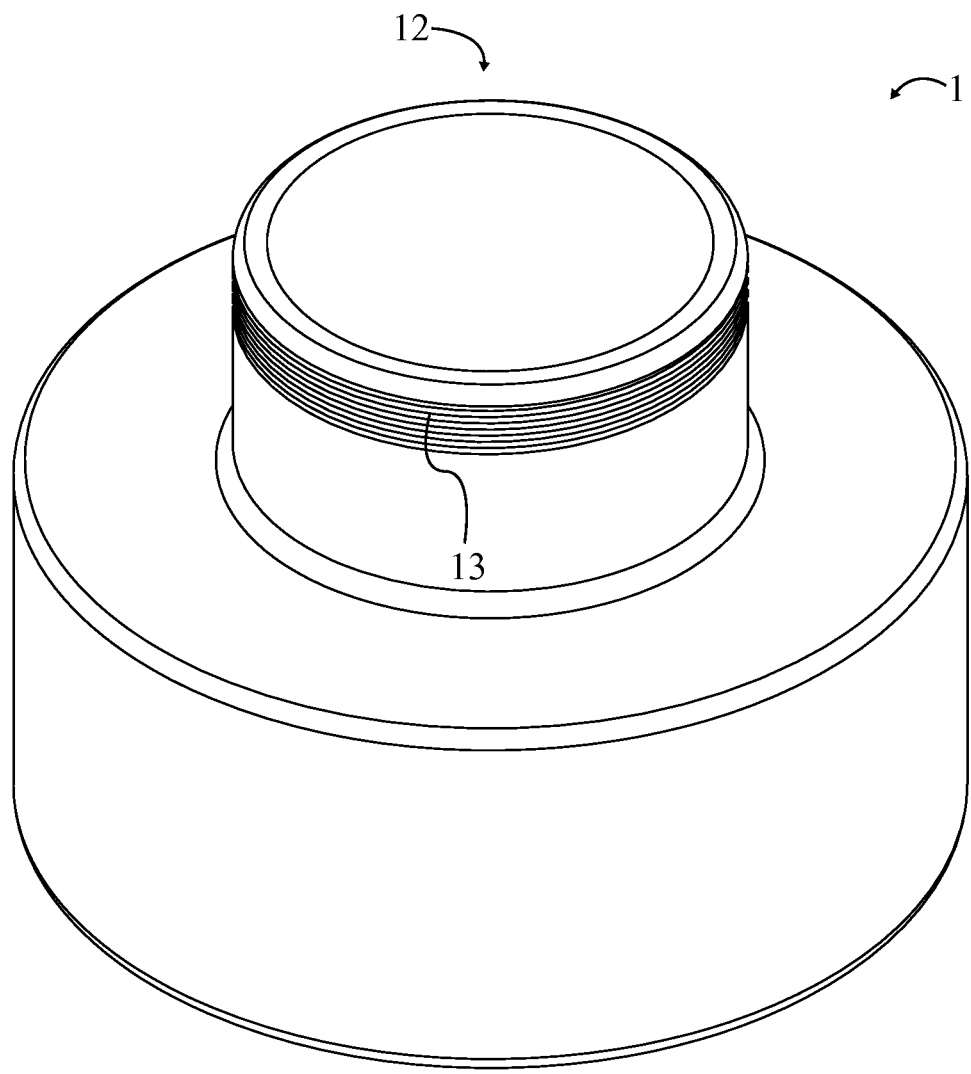
FIG. 4 is a perspective view showing a casing as an outer portion of the present invention.
Figure 5:
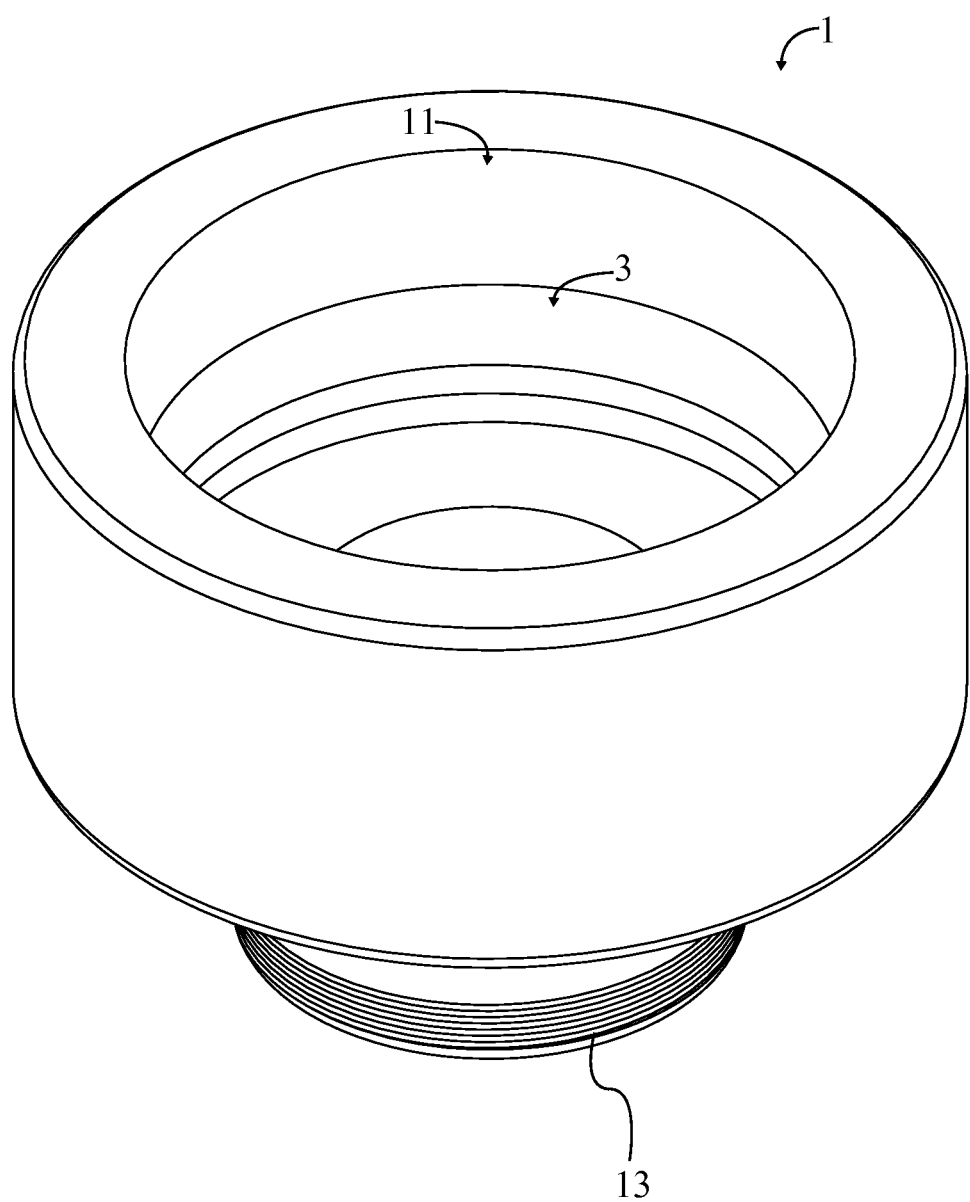
FIG. 5 is a bottom perspective view showing the casing as the outer portion of the present invention.
Figure 6:
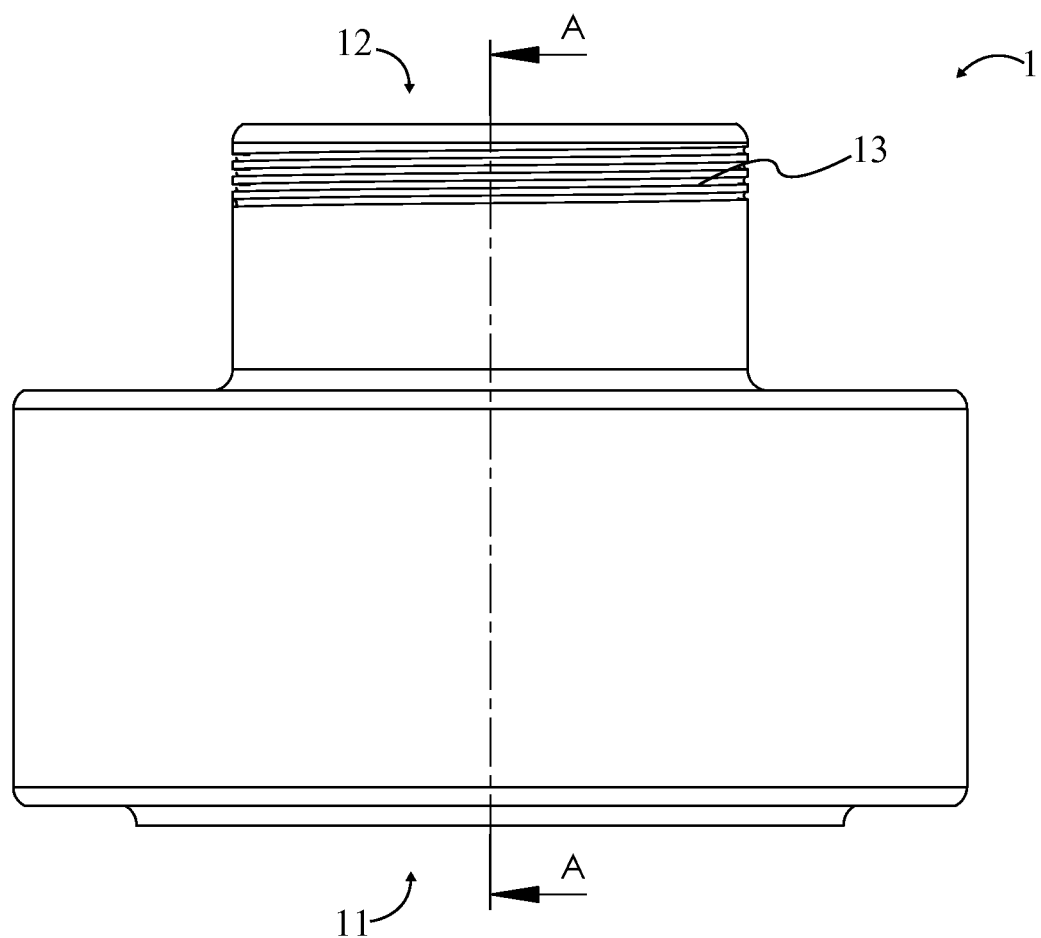
FIG. 6 is a front elevational view of the joined tube and casing, showing the plane upon which a cross-sectional view is taken and shown in FIG. 7.
Figure 7:
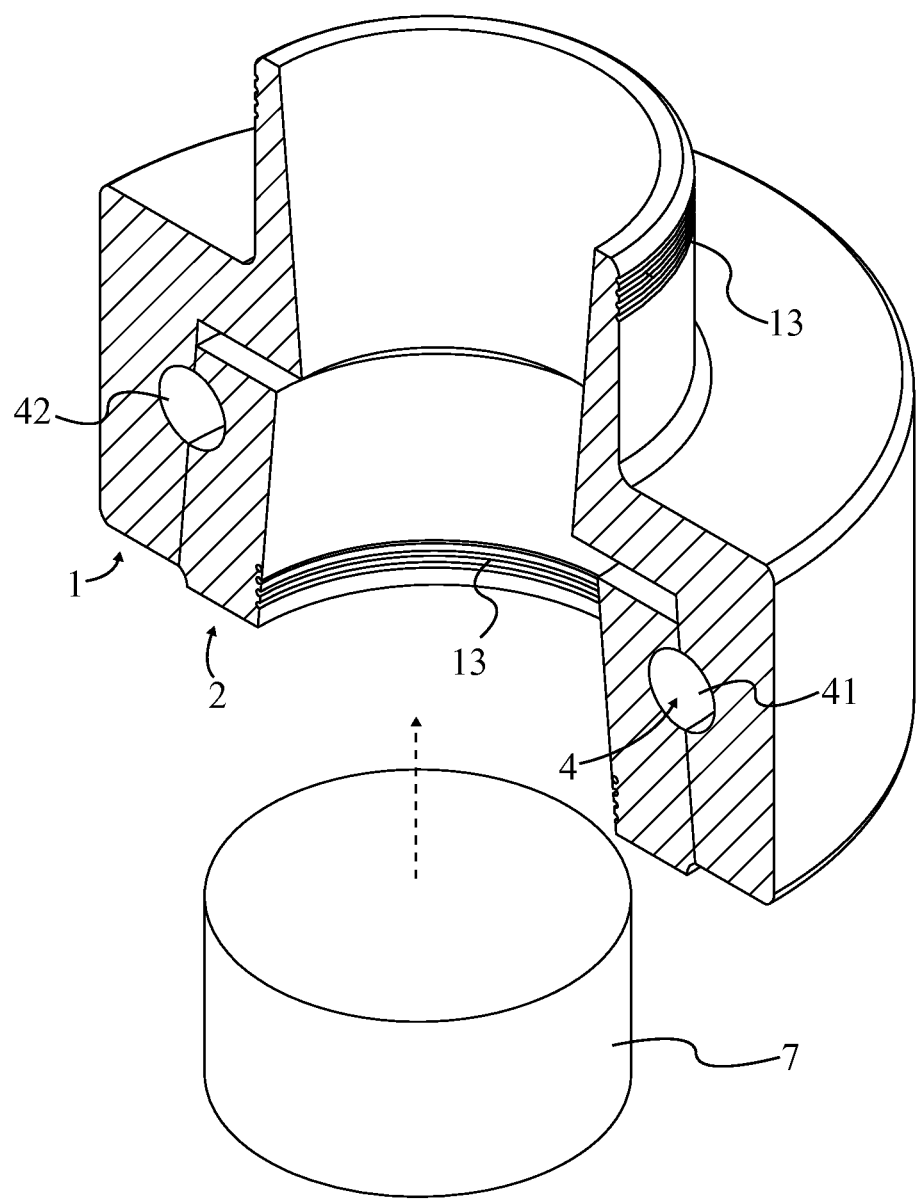
FIG. 7 is a perspective cross-sectional view thereof, taken along line A-A of FIG. 6, also showing a fill plug of the present invention.
Figure 8:
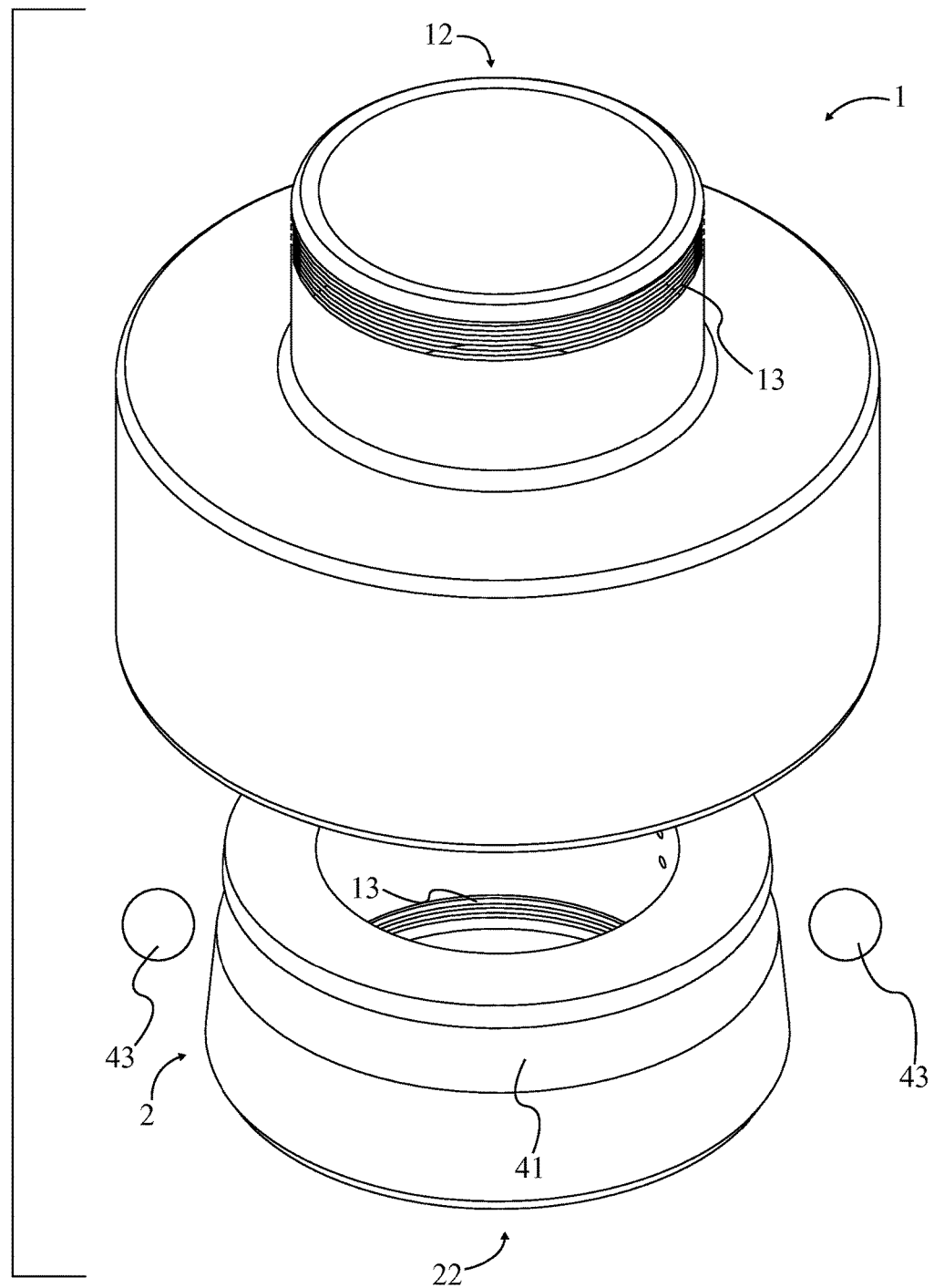
FIG. 8 is an exploded perspective view showing the tube, casing, and ball bearings of the present invention.

The present invention is an anti-tangling device that allows for rotation between two members in order to prevent tangling of coupled items such as hoses. Also referred to as "fouling", tangling of hoses and other fluid flow containment means (including those subject to certain motions and movements which cause tangling and twisting) is often an issue for automated mechanisms, e.g. automated pool cleaning systems. Integrating the present invention into such systems helps to dispose of torque and similar accumulating forces that cause hoses to twist as an automated head moves in random directions. The present invention comprises a casing 1 and a tube 2, with the tube 2 being housed in the casing 1. Furthermore, the tube 2 is rotatably engaged with the casing 1, allowing the tube 2 to rotate in relation to the casing 1, said rotation occurring about a shared axis. As the present invention is provided primarily to allow for fluid flow between two coupled hoses, the casing 1 comprises a first port 11 and a second port 12 while the tube 2 comprises a first opening 21 and a second opening 22. The first port 11 and the second port 12 are in fluid communication with each other through the tube 2; essentially, this allows fluids such as water to enter the first port 11 of the casing 1, travel through the tube 2, and exit the second port 12 of the casing 1. Likewise, the first opening 21 and the second opening 22 of the tube 2 are in fluid communication with each other, as necessary to allow water and other fluids to travel into, through, and out of the tube 2. A flow path is formed through the tube 2 and outer casing 1 as a result of the ports and openings, allowing water to flow from one hose into another while simultaneously minimizing the chances of entanglement thanks to the rotational capabilities of the tube 2. An example embodiment of the present invention is illustrated in FIG. 1-FIG. 8.

Elaborating upon the placement of the tube 2 within the casing 1, a tube-receiving volume 3 is cut through the casing 1; this results in a space that is appropriately sized for the tube 2. The tube-receiving volume 3 is oriented along a central axis of the casing 1, the central axis also being the axis of rotation. The tube-receiving volume 3 traverses into the first port 11, through the body of the casing 1, and out of the second port 12. The result is a continuous area that defines the tube-receiving volume 3. The tube-receiving volume 3 thus allows for the fluid communication between the first port 11 and the second port 12 in addition to housing of the tube 2, as previously described. Said fluid communication is maintained by the tube 2, as the first opening 21 and the second opening 22 are connected by a conduit that traverses through the tube 2. The tube 2 serves as a lateral enclosure for said conduit. The tube 2 can be retained in the tube-receiving volume 3 by a lip of the casing 1 or similar motion restricting component.

The rotational engagement between the tube 2 and casing 1 is achieved through a bearing assembly 4 in the preferred embodiment. The bearing assembly 4 comprises an inner race 41, and outer race 42, and a plurality of ball bearings 43. The inner race 41 is positioned into the tube 2, oriented around the tube 2 such that the inner race 41 forms a circular depression. Similarly, the outer race 42 is positioned into and around the outer shell, resulting in a matching circular depression. The inner race 41 is positioned around an outer surface of the tube 2, while the outer race 42 is positioned around an inner surface of the casing 1, such that the inner race 41 and the outer race 42 are adjacent to each other, forming a track between them. The plurality of ball bearings 43 is positioned between the inner race 41 and the outer race 42. The inner race 41 and outer race 42 effectively form a track for said ball bearings 43. The ball bearings 43 are prevented from moving along the created track by a cage; the cage is an open enclosure that prevents translational movement of the ball bearings 43 while still allowing for the ball bearings 43 to rotate as a result of contact with the inner race 41 and outer race 42. This is just one example of how the ball bearings 43 might be secured in the track and does not preclude the implementation of other retention mechanisms.

Potentially, to provide improved lubrication for the bearing assembly 4 and as a result decreased friction between the ball bearings 43 and the races 41 and 42, a siphon hole 5 can be cut into the tube 2. The siphon hole 5 creates a flow path between the inner casing 1 and the track, such that water or other fluids passing through the tube 2 can also enter into the track. Said fluids help to further reduce the friction between the ball bearings 43 and the track. This reduction in friction improves the rotational engagement between the casing 1 and the tube 2, which in turn allows the present invention to better prevent tangling between two coupled devices.

A corresponding drain hole 6, paralleling the siphon hole 5, is cut into an opposite end of the tube 2. The combination of the siphon hole 5 and drain hole 6 allows fluids to flow into the track at one position (i.e. the siphon hole 5) and out of the track at a second position (i.e. the drain hole 6). While an embodiment with only a single hole, such as the siphon hole 5, is possible, the single hole will inhibit fluid flow between the tube 2 and the track as it will have to accommodate bidirectional fluid travel.

The present invention can be provided in different embodiments that exclude either or both of the siphon hole 5 and drain hole 6. In these embodiments the ball bearings 43 can be left unlubricated or provided with a contained lubricant (e.g. grease or oil) being applied to the track during manufacture of the bearing assembly 4. Other treatments for the bearing assembly 4 (in an embodiment that includes such) remain possible within the scope of the present invention.

While the bearing assembly 4 allows for rotation of the tube 2 within the casing 1, the first port 11 and the second port 12 comprise a coupling mechanism 13. The coupling mechanism 13 allows for devices, e.g. hoses, to be coupled at either end of the present invention. In the illustrated embodiment, said coupling mechanism 13 is a threaded portion of the first port 11 and the second port 12. This is an ideal coupling mechanism 13 as hoses commonly have threaded ends, which can be helically engaged with a similarly equipped apparatus; in this instance, the coupling mechanism 13 of the present invention.

The present invention further comprises a fill plug 7, which is removably positioned in the tube 2. More specifically, the fill plug 7 is positioned into the first opening 21, blocking the fluid communication between the first opening 21 and the second opening 22. The fill plug 7 is provided to help seal the present invention when not being used to couple two devices; the provision of the fill plug 7 prevents leaks that might otherwise occur when a single device such as a hose is coupled to one end of the present invention.

A few example embodiments, along with application, of the present invention are subsequently described. These examples do not disclose the full range of applications of the present invention, nor do they preclude different uses of the present invention.

One such embodiment of the present invention, for example and without limitation, may be in the form of an anti-tangling device coupling which may be fitted to the head of the cleaning system so as to dispose of the torque and such forces which may accumulate and cause such tangling and twisting of the hose as the head moves in random or any path(s) at the point nearest the origin of such forces.

A further embodiment of the present invention, for example and without limitation, may be in the form of an anti-tangling device coupling which may be fitted between certain portions of the hose connecting the head to the pool wall.

An alternate embodiment or feature of the present invention, for example and without limitation, may be incorporated into the head/working portion of the cleaning system itself.

Further embodiments of the present invention may, for example and without limitation, alternatively be fitted to the pool's wall, be part of the fixture embedded in the pool wall to receive any such hose and/or cleaning system, or be comprised of any combination of the above embodiments/features that may be in any way arranged to work together.

Different embodiments may use different materials for construction of the present invention. Therefore, those of ordinary skill in the art will readily be able to select appropriate materials and manufacture the present invention according to the disclosures provided herein. Likewise, the components of the present invention can be integrally constructed or separately constructed and then later joined together in various combinations and configurations. Various implementations may be manufactured using conventional procedures, developing procedures, or a combination thereof so as to improve upon the present invention described herein.

Expanding upon the manufacture of the present invention, example processes include but are not limited to those for forming polymers, including without limitation injection molding, flow molding, and the like; milling; drilling; reaming; pressing; cutting; weldment, including ultrasonic; and others or the like. The manufactured components can then be coupled or removably coupled with each other, examples of how the components are coupled including but not limited to adhesives, weld joints, fasteners, and any combination thereof. The chosen means of coupling will often vary according to the particular materials used to construct the components, with other considerations also being taken into account.

While the present invention has been described with certain components, these components can be substituted for as long as the complete present invention results in an anti-tangling device that enables an inner piece to rotate with an outer piece, in addition to allowing fluid flow between opposite ends of said ant-tangling device. The bearing assembly 4 is an example of the above; other embodiments of the present invention can implement different assemblies as part of the present invention as long as they allow for rotation between the inner and outer parts of the present invention. Other described components may be replaced in a similar manner. These components may, for example, comprise any shape, size, style, type, model, version, class, grade, measurement, concentration, material, weight, quantity, or combination thereof, provided the components are consistent with the intended operation of the present invention.

In places where the description above refers to particular implementations of an anti-tangling device, it should be readily apparent that a number of modifications may be made without departing from the scope and/or spirit thereof and that these implementations may be applied to other such embodiments. The presently disclosed implementations are, therefore, to be considered in all respects as illustrative and not restrictive.

Although the invention has been explained in relation to its preferred embodiment, it is to be understood that many other possible modifications and variations can be made without departing from the spirit and scope of the invention as hereinafter claimed.

What is claimed is:

1. An anti-tangling coupling device comprising:
a casing;
a tube;
the casing comprising a single outer race, a first port and a second port;
the tube comprising a siphon hole, a drain hole, a single inner race, a first opening and a second opening;
the tube being housed within the casing;
the tube being rotatably engaged with the casing around a rotation axis;
the first port being in fluid communication with the second port through the tube;
the first opening being in fluid communication with the second opening;
the single inner race being externally formed on the tube;
the single outer race being internally formed on the casing;
the single inner race and the single outer race each surrounding the rotation axis;
the single inner race and the single outer race being positioned adjacent to each other so as to form a single track space therebetween;
the single track space surrounding the rotation axis;
the siphon hole and the drain hole each radially penetrating the tube;
the single track space being in fluid communication with the siphon hole and the drain hole; and
the siphon hole and the drain hole being located opposite each other along the rotation axis.

2. The anti-tangling coupling device as claimed in claim 1 comprising:
a tube-receiving volume;
the tube-receiving volume traversing into the first port, through the casing, and out of the second port; and
the tube being positioned in the tube-receiving volume.

3. The anti-tangling coupling device as claimed in claim 1 comprising:
a plurality of ball bearings;
the plurality of ball bearings being rollably engaged within the single track space; and
the tube being rotatably engaged with the casing through the plurality of ball bearings.

4. The anti-tangling coupling device as claimed in claim 3 comprising:
the siphon hole allowing a fluid to enter the single track space in order to lubricate the plurality of ball bearings; and
the drain hole allowing the fluid to exit the single track space.

5. The anti-tangling coupling device as claimed in claim 1 comprising:
the first port and the second port being positioned opposite each other along the casing.

6. The anti-tangling coupling device as claimed in claim 1 comprising:
the first opening and the second opening being positioned opposite each other along the tube.

7. The anti-tangling coupling device as claimed in claim 1 comprising:
a fill plug;
the fill plug being positioned within the tube; and
the fill plug being positioned into the first opening, the fill plug disabling a fluid communication between the first opening and the second opening.

8. The anti-tangling coupling device as claimed in claim 1 comprising:
the first opening and the second port each comprising a coupling mechanism;
the coupling mechanism of the first opening being engaged with a first accessory device, the first accessory device being a first hose; and
the coupling mechanism of the second port being engaged with a second accessory device, the second accessory device being a second hose.

* * * * *